US007671871B2

(12) United States Patent
Gonsalves

(10) Patent No.: US 7,671,871 B2
(45) Date of Patent: Mar. 2, 2010

(54) GRAPHICAL USER INTERFACE FOR COLOR CORRECTION USING CURVES

(75) Inventor: Robert Gonsalves, Wellesley, MA (US)

(73) Assignee: Avid Technology, Inc., Tewksbury, MA (US)

( * ) Notice: Subject to any disclaimer, the term of this patent is extended or adjusted under 35 U.S.C. 154(b) by 1686 days.

(21) Appl. No.: 10/177,569

(22) Filed: Jun. 21, 2002

(65) Prior Publication Data
US 2003/0234810 A1 Dec. 25, 2003

(51) Int. Cl.
G09G 5/02 (2006.01)
G09G 5/00 (2006.01)

(52) U.S. Cl. .................. 345/594; 345/589; 345/619; 345/593

(58) Field of Classification Search ................ 345/619, 345/676, 589, 590, 593, 594, 690; 358/518, 358/519; 382/167
See application file for complete search history.

(56) References Cited

U.S. PATENT DOCUMENTS

| 5,424,754 | A | * | 6/1995 | Bar et al. | 345/549 |
| 5,488,674 | A | * | 1/1996 | Burt et al. | 382/284 |
| 5,982,379 | A | * | 11/1999 | Suzuki et al. | 345/593 |
| 6,266,103 | B1 | * | 7/2001 | Barton et al. | 348/675 |
| 6,337,692 | B1 | * | 1/2002 | Rai et al. | 345/594 |
| 6,608,942 | B1 | * | 8/2003 | Le | 382/279 |
| 6,728,421 | B2 | * | 4/2004 | Kokemohr | 382/284 |
| 6,850,249 | B1 | * | 2/2005 | Gu | 345/623 |
| 2003/0103057 | A1 | * | 6/2003 | Graves et al. | 345/589 |

* cited by examiner

Primary Examiner—Hau H Nguyen
(74) Attorney, Agent, or Firm—Peter J. Gordon; Oliver Strimpel

(57) ABSTRACT

To make an intuitive interface for curves for color correction, a particular color is selected, such as gray, and the effect of each curve on pixels of that color may be displayed as a background image for the curve. A background image also may indicate a color to which tones corresponding to a selected and manipulated point of a curve will be modified or corrected. An image representing a gradient from the color component, through gray, to a complement of the color component may be displayed in association with the displayed function curve to suggest a result of color correction to be applied to the input image by manipulation of the function curve. A background image may suggest to the user what will happen if a point on the curve is moved. For example, if a user takes a point on the green curve that is in the center of the display and moves it to the lower right, the resulting image will have a magenta tint. The background image for the curve for the green channel shows more magenta in the lower right. A user can determine from an image to be corrected and the background image of the curves both which curve to use and approximately which direction to manipulate the curve.

29 Claims, 6 Drawing Sheets
(1 of 6 Drawing Sheet(s) Filed in Color)

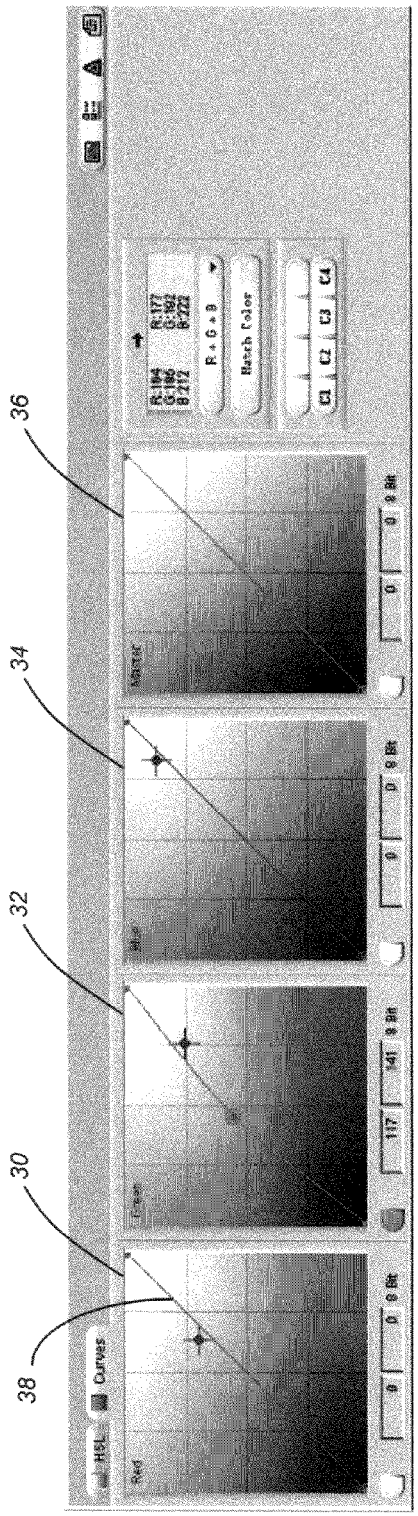
FIG. 3
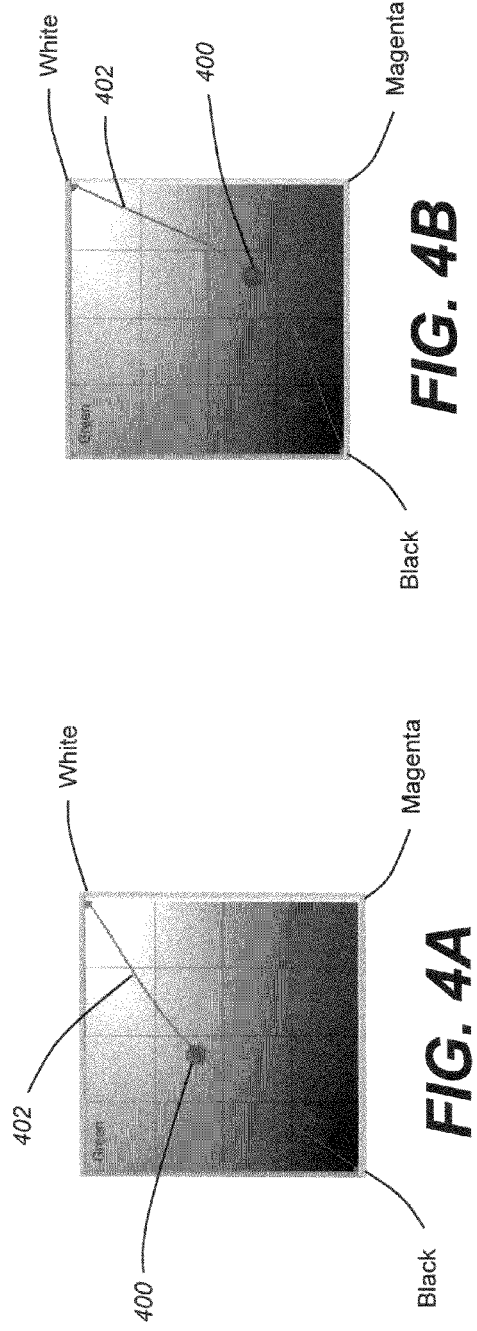
FIG. 4A
FIG. 4B

GRAPHICAL USER INTERFACE FOR COLOR CORRECTION USING CURVES

BACKGROUND

There are a variety of tools for color correction for video and still images, such as color wheels, levels and curves.

Color wheels commonly are used to set hue offsets for pixels within different ranges of luminance values. A pixel that has luminance within a specified range is modified by the hue offset set on a color wheel.

A "levels" display includes a histogram that shows how many pixels an image contains at each brightness level (for combined channels) or how many pixels an image contains at each level for each color component (for individual channels). A user can modify the levels defining the highlights, midtones and shadows in the input image to an output image, thus modifying the histogram to create new pixel data for the output image.

Curves allow a user to manipulate one or more function curves that adjust individual components of pixels of an image, such as red, green, blue components. Additionally, a master curve allows the user to manipulate simultaneously all of the components of an image with a single function curve. The RGB curves allow a user to perform a mathematically nonlinear adjustment to a color component. These curves are particularly useful for color correction because a large number of color problems in an image are nonlinear problems created at the time of acquisition of the image, and these problems are typically introduced in the red, green and blue components of pixels of the image.

As an example, in the SYMPHONY editing system from Avid Technology, Inc., the user interface for RGB curves appears as shown in FIG. 1. In this interface, four curves are displayed, for the red component 10, the green component 12, the blue component 14 and a master 16.

As another example, in the PHOTOSHOP editing system from Adobe Systems, Inc., the user interface for an RGB curve appears as shown in FIG. 2. In this interface, only one curve 20 is shown. This interface includes gradients 22 and 24 adjacent to the two axes of the function curve display. Gradient 22 informs a user of the range of input values for the channel along the horizontal axis. Gradient 24 informs a user of the range of output values for the channel along the vertical axis.

SUMMARY

The conventional user interfaces for RGB curves for color correction are not intuitive to users that are new to color correction. That is, a user that is unfamiliar with using RGB curves for color correction cannot easily predict the behavior of operations performed using these RGB curves from the user interface. Through other sources of information, such as textbooks on color correction, and practice, a user develops the ability to determine how curves will affect an image.

The lack of an intuitive display is due to the nature of the curves operation. First, there are multiple input values on a curve that are mapped to different output values. Also, the color of any pixel is dependent on both the component processed by the curve and the other components of the pixel that are not processed by the curve. Thus, two input pixels having the same value for one channel produce the same output from the function curve for that channel, but result in different colors when modified by that function curve due to the other components of the pixels.

To make an intuitive interface for curves for color correction, a particular color is selected, such as gray, and the effect of each curve on pixels of that color may be displayed as a background image for the curve. A background image also may indicate a color to which tones corresponding to a selected and manipulated point of a curve will be modified or corrected. An image representing a gradient from the color component, through gray, to a complement of the color component may be displayed in association with the displayed function curve to suggest a result of color correction to be applied to the input image by manipulation of the function curve. A background image may suggest to the user what will happen if a point on the curve is moved. For example, if a user takes a point on the green curve that is in the center of the display and moves it to the lower right, the resulting image will have a magenta tint. The background image for the curve for the green channel shows more magenta in the lower right. A user can determine from an image to be corrected and the background image of the curves both which curve to use and approximately which direction to manipulate the curve.

An example way to create a background image for a curve of a particular color component is to use a grayscale image with a vertical gradient to provide values for the color component of pixels in the background image. A grayscale image having a diagonal gradient then may be used to provide values for the other color components of the pixels. A grayscale image with a diagonal gradient may be used to provide values for all of the components of the pixels for background image of the master curve.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a diagram of an example RGB curves interface with a background image.

FIG. 4A-B are diagrams illustrating how a curve may be manipulable in a plane.

DETAILED DESCRIPTION

Figure 1:
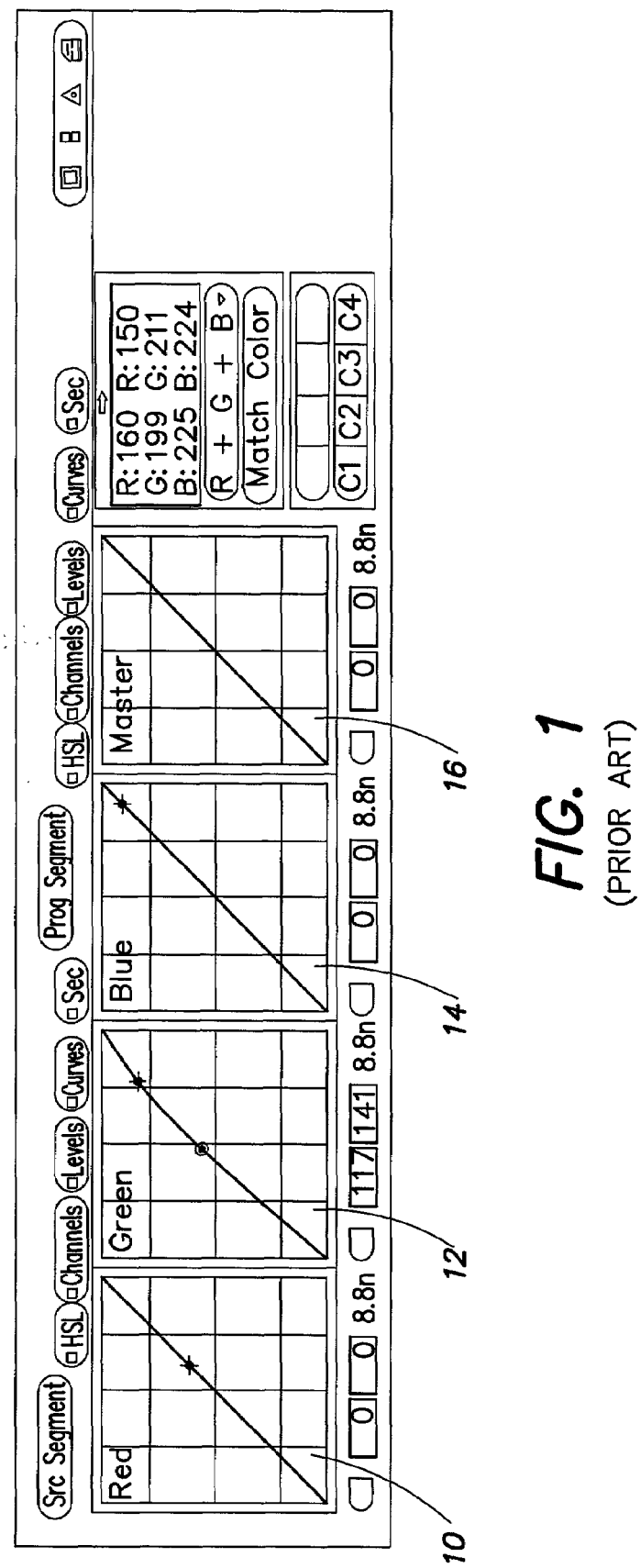
FIG. 1 is a diagram of a conventional RGB curves interface.
Figure 2:
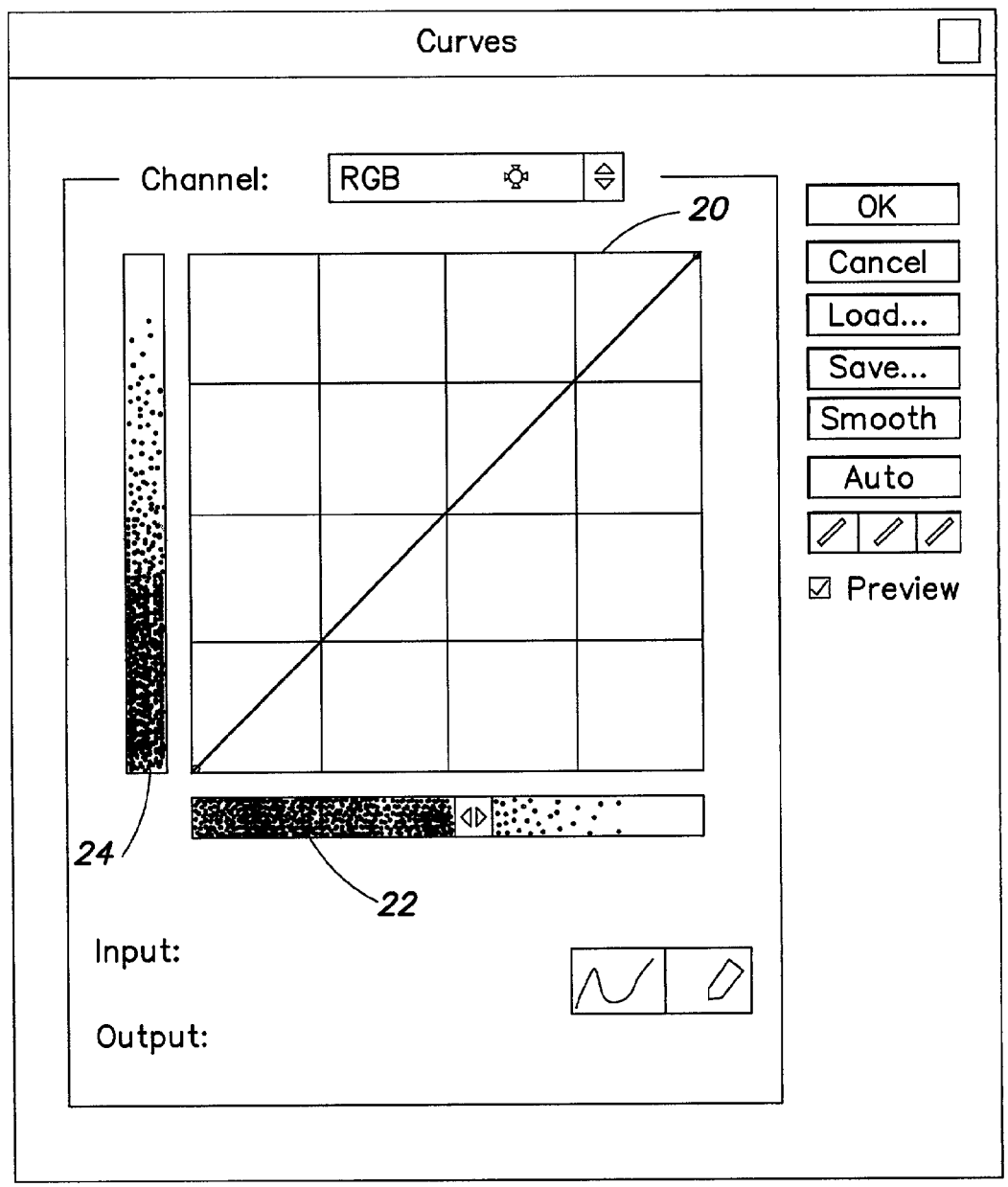
FIG. 2 is a diagram of a conventional RGB curves interface.

Referring now to FIG. 3, a diagram of an example RGB curves interface with a background image will now be described. An interface (30, 32, 34, 36) is provided for each color component or channel. The interface displays, on a background image, a user modifiable function curve 38 that maps input values for the color component of a pixel on a first axis to output values for the color component for the pixel on a second axis.

A single curve may be displayed for a single component. In some applications, it is desireable to show multiple curves for multiple components, and a master curve, such as in FIG. 3. If multiple curves are displayed, the display would include a first function curve for a red component, a second function curve for a blue component, and a third function curve for a green component as shown in FIG. 3, as well as the master curve.

The function curve also may be displayed in a rectangular display region having the first axis displayed horizontally and the second axis displayed vertically, as shown in FIG. 3. Each curve in its initial state is an identity function, and thus appears as a diagonal line on the display. However, other configurations are possible, including both different shapes of the display and different orientations of the function curve.

Conventional techniques may be provided for allowing the function curve to be manipulated, including but not limited to specifying anchor points on the curve that can be moved, and between which the rest of the curve is generated by interpolation or other mathematical function.

Any conventional structures or processes, implemented using either special purpose hardware and/or software executed by general purpose hardware, can be used to process the function curve to define and apply a color correction operation for an image.

The pixels of the background image are colors indicative of a tint that will result if the corresponding modification is applied to input pixels by adjustment of the function curve. In another aspect, the pixels of the background image are the colors of output pixels having output values for the color component corresponding to an input value for the color component from an input pixel of a selected color. The selected color may be gray, for example a gray represented by 128 Red, 128 Green and 128 Blue where red, green and blue range from 0 to 255. Other colors also may be selected. It is possible to dynamically update the display so that the background image takes into account changes made using the other color curves.

The background image also may be considered as representative of a plane in color space defined by the color component and an axis between black and white in the color space. Such a perspective is explained in more detail below in connection with FIG. 5. This image also includes a gradient from black to white along the diagonal of the function curve. Also, this background image includes a gradient from the component color, through gray, to its complement color. In the example interface in FIG. 3, this gradient occurs along the diagonal from the top right to the bottom left. The display of the complement color indicates a modification that will result by removal of the color of the channel processed by a particular curve. An image representing this gradient from the color component, through gray, to a complement of the color component may be displayed in association with the displayed function curve to suggest a result of color correction to be applied to the input image by manipulation of the function curve.

In FIGS. 4A-4B, an example of how the background image provides an intuitive interface will be provided. In particular, if a user selects a point 400 on the function curve 402 shown in FIG. 4A, that is at the center of the curve, and moves the point to the upper left to the position shown in FIG. 4A, the midtones in the scene will appear to be tinted towards green by the corresponding correction. If the user moves the same point 400 to the lower right as shown in FIG. 4B, the midtones in the scene will appear to be tinted towards magenta by the corresponding correction.

Figure 5:
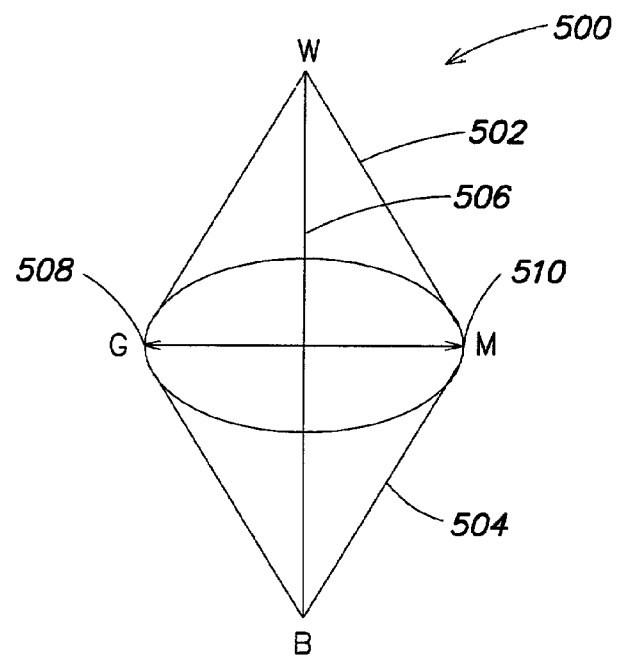
FIG. 5 is a diagram of an example color space, illustrating an axis in the color space from black to white and several planes in the color space including this axis.

FIG. 5 illustrates how the background image in FIG. 4A-4B relates to a color space. In particular, a color space has an axis defined by the luminance from a point representing black (B) to a point representing white (W). For any given color component for which a curve may be generated, the background image represents a plane in the color space that is defined by the color component and an axis between black and white in the color space. Thus, assuming an HLS color space 500 that is represented by two cones 502 and 504, the axis 506 represents luminance. The positions of green 508 (G) and magenta 510 (M) are at opposite radii from the center. The plane in the color space that incorporates green, magenta and the axis from black to white is representative of a suitable background image. Similar analyses could be made using representations of other color spaces. Because curves are commonly provided for red, green and blue components, the background images would typically be representative of planes in the color space that include red and cyan, or blue and yellow, or green and magenta.

A process from which a suitable background image may be generated will now be described in connection with FIGS. 6-8.

Figures 6, 7:
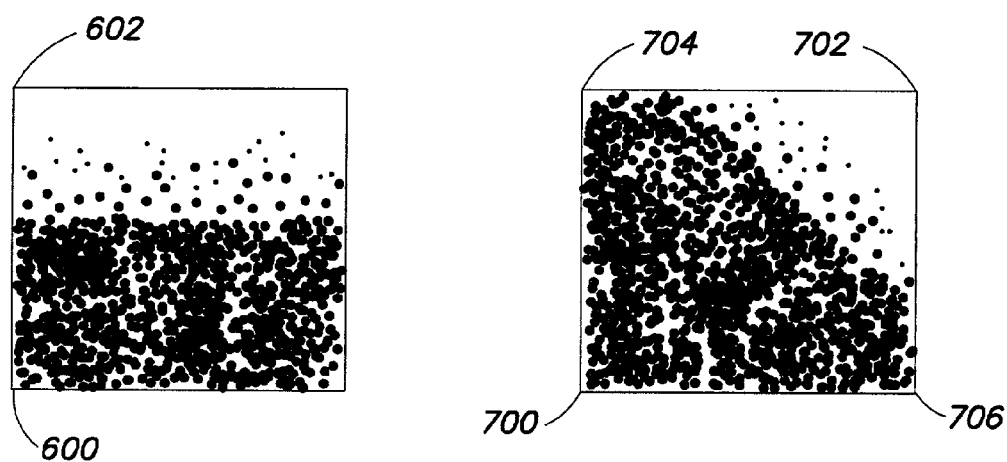
FIGS. 6 and 7 are diagrams of example images with gradients (vertical and diagonal).

FIG. 6 illustrates an image or grayscale pattern with a vertical gradient that is dark at the bottom 600 and light at the top 602. FIG. 7 illustrates an image or grayscale pattern with a diagonal gradient that is dark at the bottom left 700 and light at the top right 702, and gray at both the top left 704 and bottom right 706 corners. For pixels in the background image for each curve, values for the color component affected by the curve are defined by the image having the vertical gradient. Values for the color components not affected by the curve are defined by the image having the diagonal gradient. In effect the grayscale images with different gradients are combined to create a background image. The following tables represent how the different images are selected, colored and combined for each background image shown in FIG. 3.

| Display | Red Channel | Green Channel | Blue Channel |
| --- | --- | --- | --- |
| Red Curve | Vertical | Diagonal | Diagonal |
| Green Curve | Diagonal | Vertical | Diagonal |
| Blue Curve | Diagonal | Diagonal | Vertical |
| Master | Diagonal | Diagonal | Diagonal |

A more detailed flowchart 800 describing how these images are combined will now be described in connection with FIG. 8. This flowchart may be implemented as a computer program product comprising a computer readable medium and a computer program in a typical computer programming language such as C. Such a program is compiled and stored as executable computer program instructions on a computer readable medium that, when executed by a computer, cause the computer to perform the specified operations.

Figure 8:
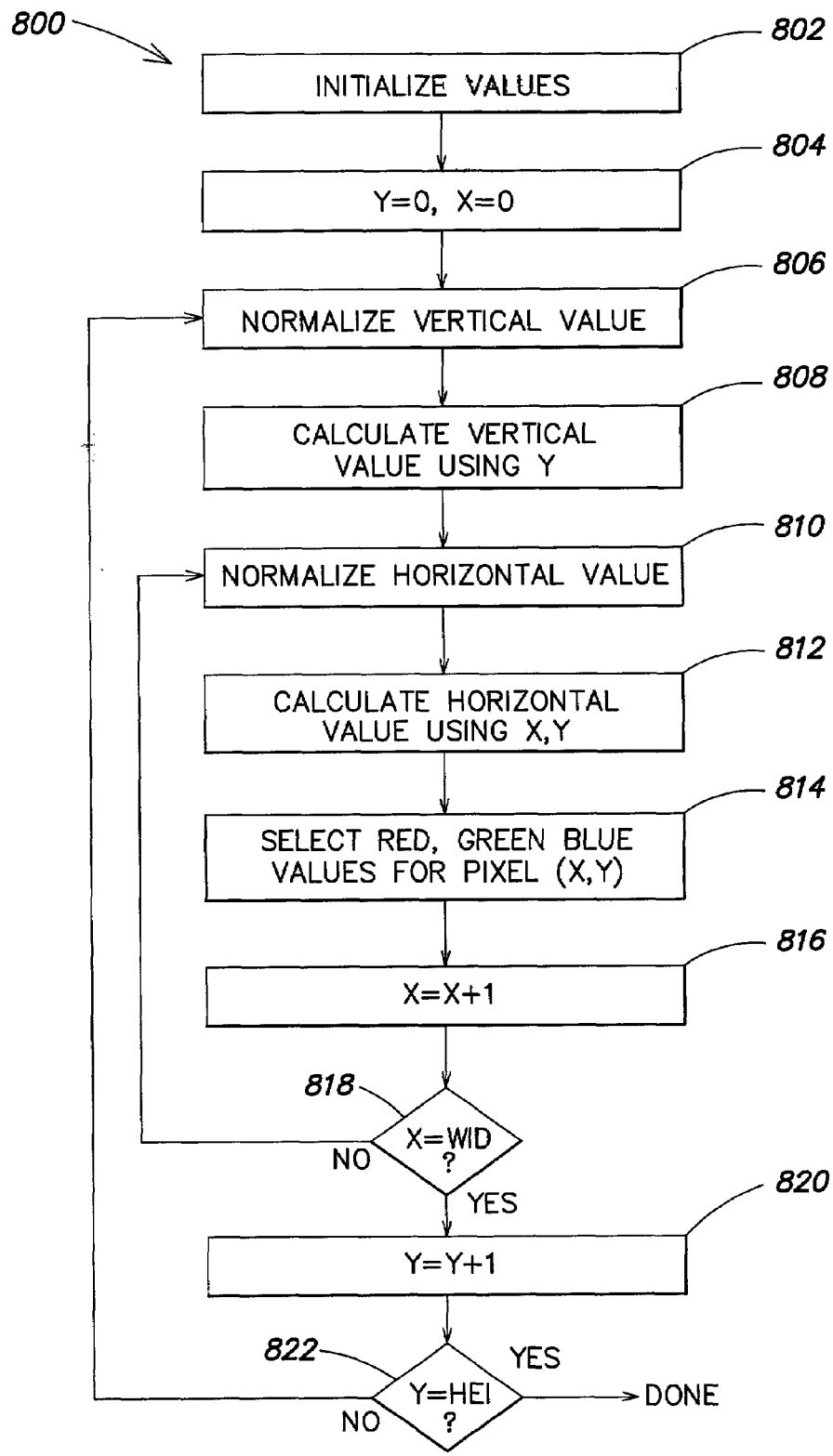
FIG. 8 is a flowchart describing how the images of FIGS. 6 and 7 may be combined to produce the background images in FIG. 3.

In FIG. 8, values are first initialized 802 according to standard programming practice. In particular, horizontal and vertical values (x,y) used to create the background image are initialized 804 to zero. A normalized y value (y_norm) that maps the current y value (y) to the designated height (hei) for the background image, given the maximum component value (max_comp), is then calculated 806 by computing:

$$y\_norm=max\_comp-y*max\_comp/hei.$$

On an 8-bit system, max_comp=255. A value "vertical" is then computed 808 to provide the value of the vertical gradient gray scale image for the current line of the background image, by computing:

$$vertical=y\_norm.$$

This value can be forced to be a valid value for a component of a pixel.

A normalized x value (x_norm) that maps the current x value (x) to the designated width (wid) for the background image is then calculated 810, by computing:

x_norm=x*max_comp/wid.

A value "diagonal" is then computed 812 to provide the value of the horizontal gradient gray scale image for the current x position in the current y line of the background image, by computing:

diagonal=(x_norm+y_norm)/2.

This value can be forced to be a valid value for a component of a pixel. According to the table above and the curve for which the background image is being created, the current pixel of the background image is created 814 by using either the "diagonal" value or the "vertical" value for the designated component. For example, if a background image is being generated for the red channel, the red component is set to "vertical", whereas the green and blue components are set to "diagonal". The x value is then incremented 816. If the x value equals the width (wid), as determined in 818, the end of the line has been reached and the next line is processed by incrementing y in 820. Otherwise, processing returns to 810. After the y value has been incremented in 820, if y is equal to the height (hei), as determined in 822, then the image has been generated, otherwise processing returns to 806.

Figure 9:
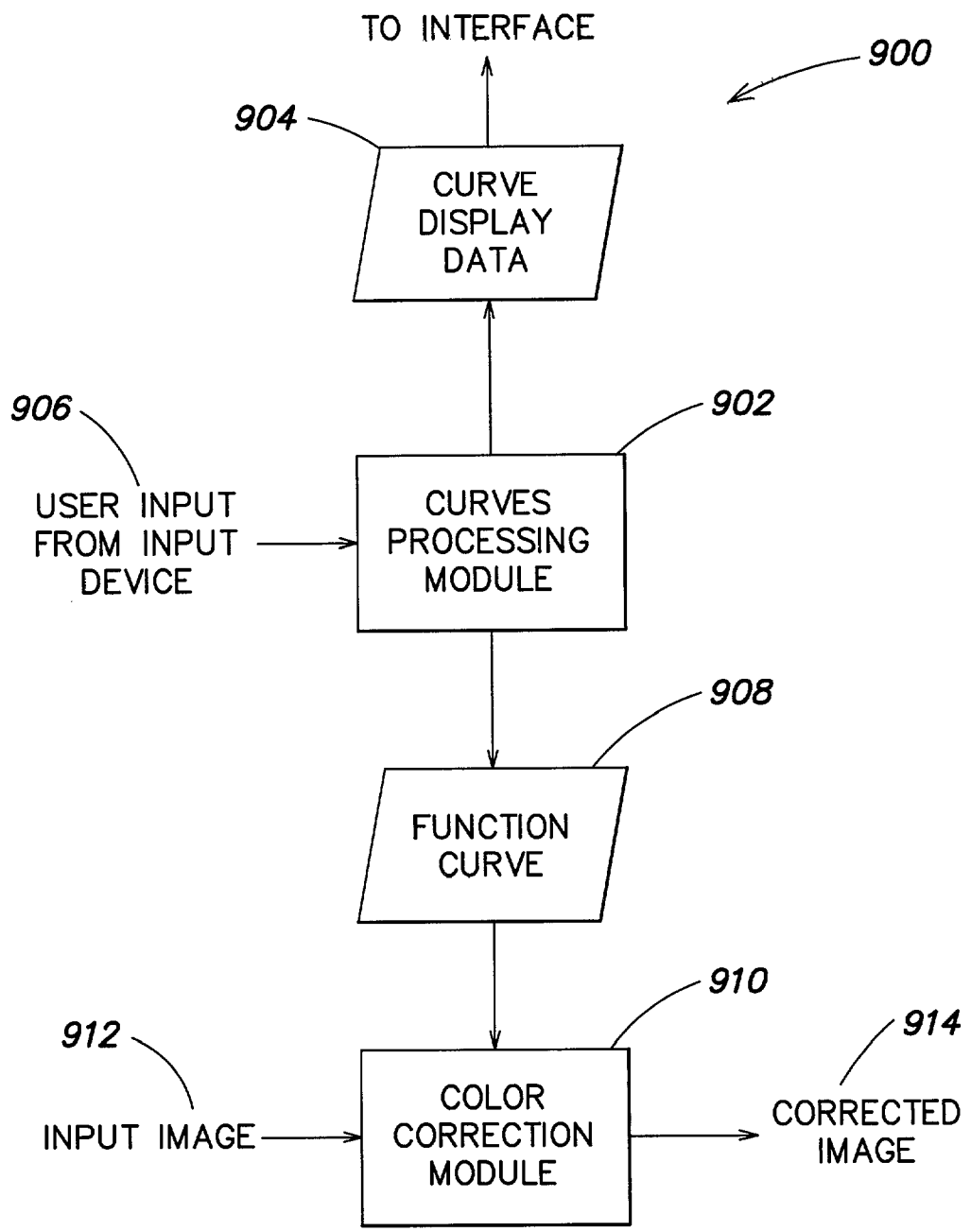
FIG. 9 is a block diagram of an example system for color correction.

FIG. 9 is a data flow diagram of an example system 900 for color correction using curves. A curves processing module 902 generates curve display data 904. The curves display data includes graphical representations of the function curve for a color component and a background image or other display data that suggests how modifications to the function curve will affect an image. This display data is provided to a user interface (not shown), which is typically a computer display. User input 906 is received from an input device (not shown) such as a keyboard, mouse, trackball or other conventional computer input device. The curves processing module 902 provides the definition of a function curve 908 and the display data 904 according to changes to the function curve specified by the user. The function curve definition 908 is provided to a color correction module 910 that processes an input image 912 to produce an output image 914 according to the function curve. The output image 914 also may be displayed to the user through the user interface (not shown) or through another display. The curves processing module and the color correction module may be implemented using special purpose hardware and/or computer programs executed on general purpose hardware.

Having now described an example implementation, it should be apparent to those skilled in the art that the foregoing is merely illustrative and not limiting, having been presented by way of example only. Numerous modifications and other implementations are within the capabilities of one of ordinary skill in the art and are contemplated as falling within the scope of the invention.

What is claimed is:

1. A graphical user interface for performing color correction, comprising:

an interface that displays a plurality of user modifiable function curves, wherein each function curve is for a different color component and maps input values for the color component of a pixel on a first axis to output values for the color component for the pixel on a second axis, wherein each function curve is displayed on a different one of a plurality of background images, wherein the pixels of the background image for a function curve for a color component are the colors of output pixels having output values for the color component that correspond to an input value for the color component from an input pixel of a selected color; and a processor that processes modifications made to the function curve to define a color correction operation.

2. The graphical user interface of claim 1, wherein the selected color is gray.

3. The graphical user interface of claim 1, wherein the interface displays a first function curve for a red component, a second function curve for a blue component, and a third function curve for a green component.

4. The graphical user interface of claim 3, wherein each function curve is displayed in a rectangular display region having the first axis displayed horizontally and the second axis displayed vertically.

5. The graphical user interface of claim 1, wherein the function curve is displayed in a rectangular display region having the first axis displayed horizontally and the second axis displayed vertically.

6. A computer program product, comprising:

a computer readable medium;

computer program instructions stored on the computer readable medium that, when executed by a computer, instruct the computer to implement a graphical user interface for performing color correction, comprising:

an interface that displays a plurality of user modifiable function curves, wherein each function curve is for a different color component and maps input values for the color component of a pixel on a first axis to output values for the color component for the pixel on a second axis, wherein each function curve is displayed on a different one of a plurality of background images, wherein the pixels of the background image for a function curve for a color component are the colors of output pixels having output values for the color component that correspond to an input value for the color component from an input pixel of a selected color.

7. The computer program product of claim 6, wherein the selected color is gray.

8. The computer program product of claim 6, wherein the interface displays a first function curve for a red component, a second function curve for a blue component, and a third function curve for a green component.

9. The computer program product of claim 8, wherein each function curve is displayed in a rectangular display region having the first axis displayed horizontally and the second axis displayed vertically.

10. The computer program product of claim 6, wherein the function curve is displayed in a rectangular display region having the first axis displayed horizontally and the second axis displayed vertically.

11. A method for providing a graphical user interface for performing color correction, comprising:

displaying a plurality of user modifiable function curves, wherein each function curve is for a different color component and maps input values for the color component of a pixel on a first axis to output values for tile color component for the pixel on a second axis, wherein each function curve is displayed on a different one of a plurality of background images, wherein the pixels of the background image for a function curve for a color component are the colors of output pixels having output values for the color component that correspond to an input value for the color component from an input pixel of a selected color; and processing modifications made to the function curve to define a color correction operation.

12. The method of claim 11, wherein the selected color is gray.

13. The method of claim 11, wherein displaying comprises displaying a first function curve for a red component, a second function curve for a blue component, and a third function curve for a green component.

14. The method of claim 13, wherein each function curve is displayed in a rectangular display region having the first axis displayed horizontally and the second axis displayed vertically.

15. The method of claim 11, wherein the function curve is displayed in a rectangular display region having the first axis displayed horizontally and the second axis displayed vertically.

16. A graphical user interface for performing color correction, comprising:

an interface that displays a plurality of user modifiable function curves, wherein each function curve is for a different color component and maps input values for the color component of a pixel on a first axis to output values for the color component for the pixel on a second axis, wherein each function curve is displayed on a different one of a plurality of background images, wherein the one of the plurality of background images represents a plane in color space defined by the color component and an axis between black and white in the color space; and a processor that processes modifications made to the curve to define a color correction operation.

17. The graphical user interface of claim 16, wherein the plane includes red and cyan.

18. The graphical user interface of claim 16, wherein the plane includes blue and yellow.

19. The graphical user interface of claim 16, wherein the plane includes green and magenta.

20. The graphical user interface of claim 16, wherein the interface displays a first function curve for a red component, a second function curve for a blue component, and a third function curve for a green component.

21. The graphical user interface of claim 20, wherein each function curve is displayed in a rectangular display region having the first axis displayed horizontally and the second axis displayed vertically.

22. The graphical user interface of claim 16, wherein the function curve is displayed in a rectangular display region having the first axis displayed horizontally and the second axis displayed vertically.

23. A graphical user interface for performing color correction, comprising:

an interface that displays a plurality of user modifiable function curves, wherein each function curve is for a different color component and maps input values for the color component of a pixel on a first axis to output values for the color component for the pixel on a second axis, wherein each function curve is displayed on a different one of a plurality of background images, wherein each pixel of the one of the plurality of background images has a color indicative of a result of color correction to be applied by the function curve if a point on the function curve were moved toward the pixel of the background image; and a processor that processes modifications made to the curve to define a color correction operation.

24. A graphical user interface for performing color correction, comprising:

an interface that displays a plurality of user modifiable function curves, wherein each function curve is for a different color component and maps input values for the color component of a pixel on a first axis to output values for the color component for the pixel on a second axis, and that displays, for each function curve, a different one of a plurality of background images, each background image representing a gradient from the color component, through gray, to a complement of the color component, wherein the user modifiable function curve is displayed on the background image so as to suggest a result of color correction to be applied to the input image by manipulation of the friction curve; and a processor that processes modifications made to the function curve to define a color correction operation.

25. The graphical user interface of claim 24, wherein the color component is red and the complement is cyan.

26. The graphical user interface of claim 24, wherein the color component is blue and the complement is yellow.

27. The graphical user interface of claim 24, wherein the color component is green and the complement is magenta.

28. A method for generating a graphical user interface for performing color correction operations, comprising:

generating a plurality of background images, wherein for each background image, generating comprises:

accessing a first image having a vertical gradient of a color component;

accessing a second image having a diagonal gradient of at least one other color component; and combining the first and second images to create the background image;

displaying controls for a function curve for the color component on the background image; and displaying the function curve for the color component on the background image.

29. A computer system for performing color correction, comprising:

a graphical user interface that displays a plurality of different background images and a plurality of user modifiable function curves, wherein each of the plurality of user modifiable function curves is for a respective color component, wherein each user modifiable function curve maps input values for a color component of a pixel on a first axis to output values for the color component for the pixel on a second axis, wherein each user modifiable function curve is displayed on a respective one of the plurality of background images;

wherein, for each user modifiable function curve, pixels of the one of the plurality of background images for the user modifiable function curve are the colors of output pixels having output values for the color component for the user modifiable function curve corresponding to an input value for the color component for the user modifiable function curve from an input pixel of a selected color;

a processor programmed to make modifications to each of the displayed user modifiable function curves to define a color correction operation in response to user input; and wherein the processor is programmed to apply the color correction operation defined by the user modifiable function curves to an input image.

* * * * *